United States Patent [19]

Häder et al.

[11] Patent Number: 5,152,609
[45] Date of Patent: Oct. 6, 1992

[54] METHOD FOR MEASURING THE TEMPERATURE OF THE MIX IN A MIXING CHAMBER OF A KNEADER

[75] Inventors: Walter Häder, Olpe; Andreas Limper, Wenden-Schönau; Wolfgang Engel, Freudenberg-Oberfischbach, all of Fed. Rep. of Germany

[73] Assignee: Werner & Pfleiderer Gummitechnik GmbH, Fed. Rep. of Germany

[21] Appl. No.: 732,406

[22] Filed: Jul. 18, 1991

[30] Foreign Application Priority Data

Aug. 4, 1990 [DE] Fed. Rep. of Germany ....... 4024863

[51] Int. Cl.$^5$ .......................................... G01K 13/02
[52] U.S. Cl. ................................... 374/141; 374/121; 374/110; 366/142
[58] Field of Search ............. 374/110, 112, 115, 120, 374/121, 129, 133, 134, 139, 140, 141, 179, 181; 250/338.1, 338.3; 366/76, 142, 151, 332

[56] References Cited

U.S. PATENT DOCUMENTS

| | | | |
|---|---|---|---|
| 4,527,896 | 7/1985 | Irani et al. | 374/133 X |
| 4,741,626 | 5/1988 | Hoshimoto | 374/121 X |
| 4,831,258 | 5/1989 | Paulk et al. | 374/121 X |
| 4,842,674 | 6/1989 | Freti et al. | 374/139 X |
| 4,953,984 | 9/1990 | Miyoshi | 366/151 X |

FOREIGN PATENT DOCUMENTS 2617803 11/1977 Fed. Rep. of Germany .
58213873 6/1985 Japan ................................ 374/140

Primary Examiner—William A. Cuchlinski, Jr.
Assistant Examiner—G.Bradley Bennett
Attorney, Agent, or Firm—Laff, Whitesel, Conte & Saret

[57] ABSTRACT

In a method for measuring the temperature of the mix in a mixing chamber of a kneader, the temperature of the mix being continuously measured by means of at least one sensor projecting into the mixing chamber, for the purpose of correcting measuring errors due to the heat conductivity of the sensor housing, a second sensor, in particular in the form of an infra-red sensor, is provided and directly detects the temperature of the mix at certain discrete times during the mixing process, the continuous temperature measuring of the first sensor being corrected according to the measuring of the second sensor when the mixing process is continued.

3 Claims, 2 Drawing Sheets

METHOD FOR MEASURING THE TEMPERATURE OF THE MIX IN A MIXING CHAMBER OF A KNEADER

FIELD OF THE INVENTION

The invention relates to a method for measuring the temperature of the mix in a mixing chamber of a kneader, the temperature of the mix being continuously measured by means of at least one sensor projecting into the mixing chamber.

BACKGROUND OF THE INVENTION

A measuring as precise as possible of the mixing temperature at a certain time of the mixing process is of special importance for the control of the mixing process and the quality of the final product, for instance when rubber mixtures are compounded in rubber kneaders.

In this regard, it is known to let a temperature sensor project into the mixing chamber at certain places. Such temperature sensors may be provided in the form of a thermocouple or a resistance thermometer. As a result of the high stress during the mixing process the housing of such a sensor must be made very stable. On the other hand, an adequately stable design of the housing will result in considerable errors due to the thermal conductivity of the housing. Measuring errors of up to 15K may be caused.

Any attempts to reduce these measuring errors have so far essentially consisted in structural measures taken in the mechanical field. For instance, attempts have been made to achieve an improvement by means of a ceramic jacket and defined slots. However, the measuring error still amounts to 5K even with temperature sensors structured in such a way.

A further problem of temperature measuring with conventional sensors results from the fact that the thermal conductivity of the mixture continuously changes during the mixing process and that the coefficient of heat transmission between the mixture and the temperature sensor changes. On the one hand, this is due to the fact that the whole mixture usually consists of about 20 components gradually supplied to the mixing chamber according to certain criteria, while the mixing chamber always remains only partially filled. On the other hand, some mixture components change in condition during the mixing process. Natural caoutchouc and other elastomers, for example, change their molecular weight and their temperature. Carbon black and other components of many mixtures are added only in agglomerated form. These agglomerates are broken open and the particles mix with the elastomers.

It is also known to detect the temperature of the mix in non-contacting manner by means of an infra-red sensor in the case of plastic mixtures, to which effect a window is provided in the mixing chamber and the infra-red sensor is to detect the temperature of the mix through this window. However, when applied this method has the disadvantage that the window pane gets dirty and scratched, so that further sources of error are added to the basic measuring errors caused by the measuring from outside through the pane.

SUMMARY OF THE INVENTION

It is accordingly the object of the invention to improve a method of the above generic type with a view to the temperature measuring such that, at each stage of the mixing process, a measured temperature as precise as possible is available to control the mixing process.

In accordance with the invention this object is attained in that a second sensor in particular in the form of an infra-red sensor, is provided and directly detects the temperature of the mix at certain discrete times during the mixing process, the continuous temperature measuring of the first sensor being corrected according to the measuring of the second sensor when the mixing process is continued.

The basic idea according to the invention consists in using mixing intervals anyway arising during mixing processes of the kind in question to detect the actual temperature of the mix at this time by a measuring taken directly at the mix and to use this measured value for correction in the subsequent mixing phase.

In an advantageous embodiment it is in particular provided that the temperature of the mix is detected by an infra-red sensor each time the stamp is lifted when the kneader used is a stamp kneader.

The stamp of stamp kneaders for rubber mixes must anyway be lifted during the mixing process for methodic reasons, in particular for the addition of further components, so that no special interruption of the mixing process is necessary to carry out the measuring. Since further components are added at comparatively regular intervals throughout the mixing process, a rather continuous correction is possible during this period of time also within the scope of the method according to the invention.

It may favourably be provided that the difference of the values measured by the first sensor right before the lifting of the stamp and the values measured by the second sensor when the stamp is lifted is calculated and stored and that, in the following mixing phase, this difference is superposed on the temperature measured by the first sensor and the value thus corrected is used to control the mixing process until the stamp is lifted again or till the end of the mixing process.

An advantageous embodiment consists in that, when the stamp is lifted, the second sensor is entered into the stamp shaft under the stamp through a lateral flap. This may be a separate flap or a charging flap anyway provided. The charging flap must be opened anyway for the supply of additional components and it can be realized without any problems even when it does not have to be opened at each phase.

Alternately, there is a possibility of introducing a deflection mirror into the shaft, which directs the heat radiation of the mix towards the sensor, instead of entering the second sensor provided as an infra-red sensor into the stamp shaft.

Further details of the invention will become apparent from the ensuing description of an exemplary embodiment taken in conjunction with the drawing, in which

DESCRIPTION OF THE PREFERRED EMBODIMENT

Figure 1:
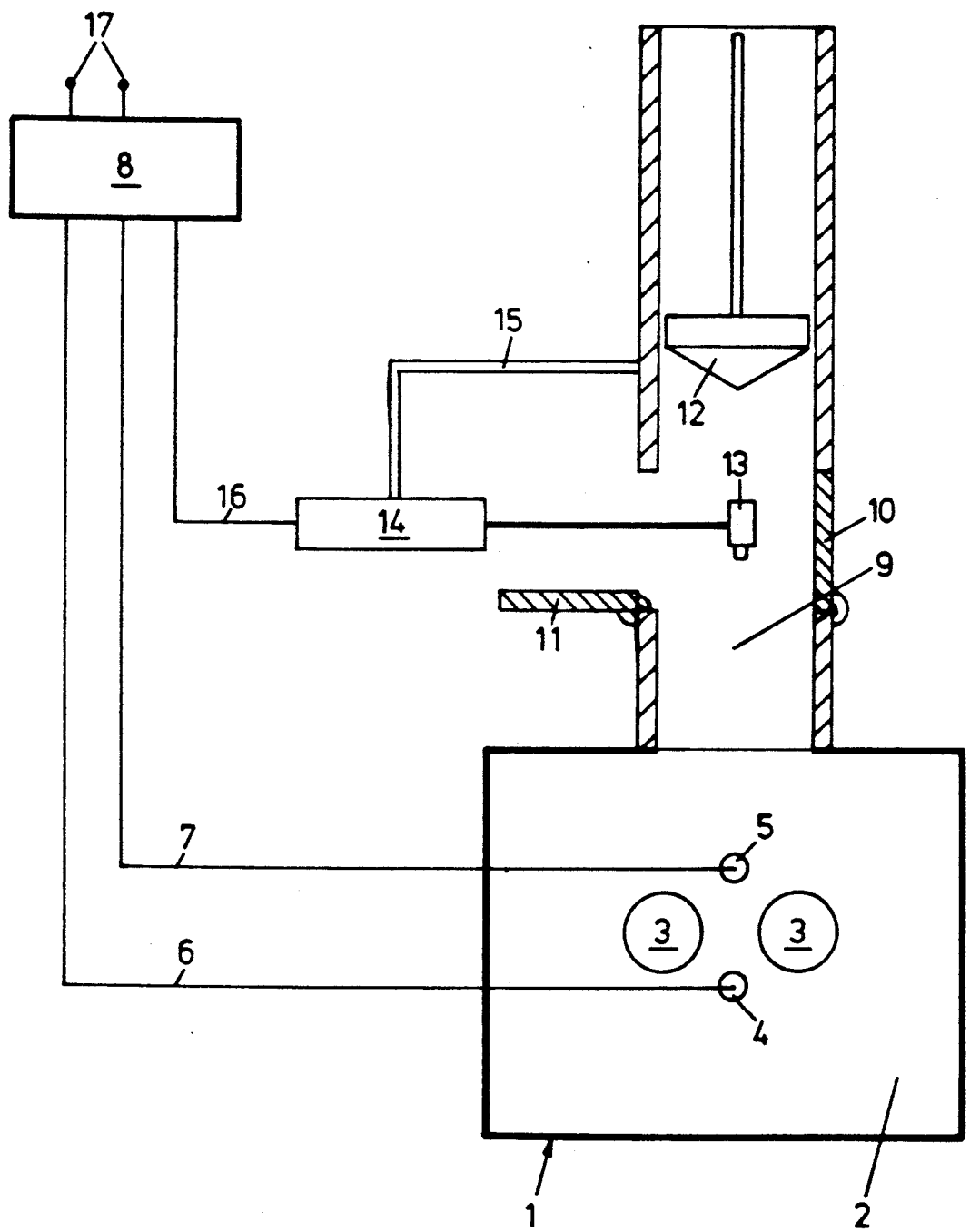
FIG. 1 is a block diagram type of representation of a stamp kneader with sensors to detect the temperature of the mix.

FIG. 1 shows a stamp kneader 1 as it is usually used to compound caoutchouc mixtures. It comprises a mixing chamber 2 with mixing tools 3 shown diagrammatically. Two first temperature sensors 4, 5 are arranged adjacent to the mixing tools 3 and have for instance the form of a thermocouple and are connected with a central evaluation and control unit 8 by way of lines 6, 7.

A stamp shaft 9 follows above the mixing chamber 2; a charging flap 10 and a measuring flap 11 are provided in the side walls of this stamp shaft 9, the measuring flap 11 being shown in an opened state.

A stamp 12 is supported in the stamp shaft 9 to be driven up and down, it is shown in its lifted position in the drawing.

A second sensor 13 has the form of an infra-red sensor to be entered through the opened measuring flap 11 into the charging shaft by means of a drive and control unit 14 secured to the outside of the stamp shaft 9 by way of a retaining frame 15 such that, in this position, direct optical contact with the mix and thus contactless detection of its temperature is possible through the sensor 13. At the end of the measuring the sensor 13 is again moved outwards, i.e. to the left in FIG. 1, after which the measuring flap 11 can again be closed and the stamp 12 can be lowered.

The drive and control unit 14 is connected with the evaluation and control unit 8 via a line 16; the evaluation and control unit 8 has exits 17 through which output signals are given, subject to the temperature data corrected according to the following method.

Figure 2:
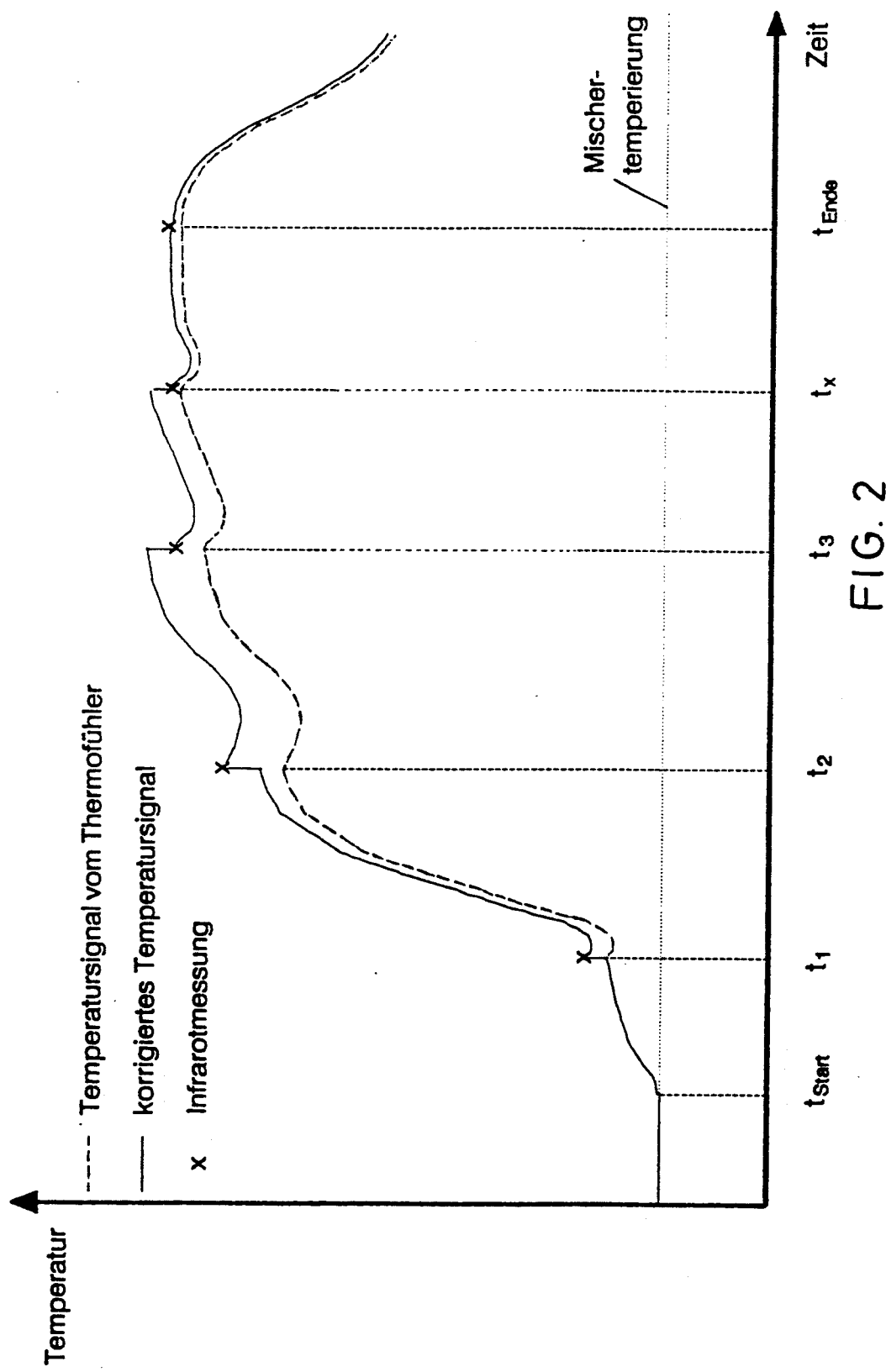
FIG. 2 shows the curve of the continuously measured temperature of the mix according to the first sensor, the discontinuously measured values of the second sensor, and the corrected temperature as a basis for the control of the mixing process.

FIG. 2 is a diagrammatic representation of the curve of the temperature of the mix in dependence on the time during a mixing process.

The mixing process starts at the time $t_{Start}$ at a temperature corresponding to the temperature of the mixer. Once the mixing process has started, the temperature increases, until the mixing process is interrupted at a time $t_1$ while the stamp 12 is down, then the stamp 12 is lifted for the supply of carbon black through the charging flap 10.

Prior to the supply of carbon black the infra-red sensor 13 is moved out and brought into the stamp shaft 9 through the measuring flap 11, so that the temperature of the mix can be detected directly in the mixing chamber 2. The infra-red sensor 13 is then retracted and the carbon black is suplied, after which the flaps 10, 11 are again closed.

The result of the temperature measurements made by the first sensors 4, 5 through direct contact with the mix right before the flap 11 is opened is stored in the evaluation and control unit 8 and compared with the stored value measured by the second sensor 13. It is to be seen from FIG. 2 that, as a result of the error caused by heat carried off to the housing, the first sensors 4, 5, i.e. the thermocouples, indicate a temperature lower than the real temperature of the mix detected by the second sensor and shown in FIG. 2 in the form of a measuring point (cross). The reason why the temperature measured by the sensors 4, 5 is too low resides in that heat is carried off from the free actual measuring head via their housing.

When the mixing process continues from the time $t_1$ to $t_2$, this difference in temperature is deducted from the temperatures continuously measured by the first temperature sensors 4, 5, so that a corrected curve of temperature results, as it is shown by a solid line in FIG. 2 in comparison with the temperature curve not corrected shown in a dashed line.

At the time $t_2$ bright additional components are added and a renewed temperature correction is carried out in the manner described above, while, due to the increasing further heating the thermocouples forming the first temperature sensors, 4, 5 still indicate too low a temperature.

At the time $t_3$ cross-linking chemicals are added and the temperature measurement is again corrected in the same way, however to a lower value. The same takes place whenever raw material is added at a time $t_x$ or at a plurality of points $t_x$ or when the stamp is lifted for methodical reasons. When, in the further course of mixing, i.e. from $t_3$ onwards, the time-depending variation of the heating decreases, the differences in the values measured decrease, too, due to the direct measuring via the sensors 4, 5 and the infra-red sensor 13, so that the initial correction can be reduced step by step and, in the case of the protracted mixing processes, the corrected temperature curve only slightly differs from the not corrected measuring curve towards the end of the mixing process $t_{END}$.

What is claimed is:

1. A method for measuring the temperature of a mix in a mixing chamber of a kneader, the temperature of the mix being continuously measured by means of a first sensor projecting into the mixing chamber, characterized in that a second infra-red sensor is provided which directly detects the temperature of the mix at certain discrete times during the mixing process each time a stamp is lifted, the continuous temperature measuring of the first sensor being corrected according to the measuring of the second sensor when the mixing process is continued, the difference of the values measured by the first sensor right before the stamp is lifted and the value measured by the second sensor when the stamp is lifted is calculated and stored, and in that, in the following mixing phase, this difference is superposed on the temperature measured by the first sensor and the value thus corrected is used to control the mixing process until the stamp is lifted again or until the end of the mixing process.

2. A method according to claim 1 characterized in that, when the stamp is lifted, the second sensor is entered into a stamp shaft under the stamp through a flap.

3. A method according to claim 1 characterized in that, when the stamp is lifted, a deflection mirror is introduced into a stamp shaft under the stamp.

* * * * *